(12) United States Patent
Ogawa et al.

(10) Patent No.: US 11,522,449 B2
(45) Date of Patent: Dec. 6, 2022

(54) TRANSFORMATION CONTROL DEVICE AND SOLENOID VALVE DRIVING DEVICE

(71) Applicant: Hitachi Astemo, Ltd., Hitachinaka (JP)

(72) Inventors: Atsushi Ogawa, Hitachinaka (JP); Motoaki Kato, Hitachinaka (JP); Kengo Nomura, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/397,109

(22) Filed: Aug. 9, 2021

(65) Prior Publication Data
US 2022/0103068 A1 Mar. 31, 2022

(30) Foreign Application Priority Data

Sep. 30, 2020 (JP) .............................. JP2020-164527

(51) Int. Cl.
*F02D 41/20* (2006.01)
*H02M 3/156* (2006.01)
*F02M 51/06* (2006.01)
*H01F 7/06* (2006.01)

(52) U.S. Cl.
CPC ............. *H02M 3/156* (2013.01); *F02D 41/20* (2013.01); *F02M 51/061* (2013.01); *H01F 7/064* (2013.01)

(58) Field of Classification Search
CPC ...... F02D 41/20; F02M 51/061; H02M 3/156; H01F 7/064
USPC ........................ 123/472, 478, 479, 480, 490; 701/103–105
See application file for complete search history.

(56) References Cited

U.S. PATENT DOCUMENTS 9,621,162 B2 * 4/2017 Abouda ......... H03K 19/017509

FOREIGN PATENT DOCUMENTS

JP 2012158985 A 8/2012

* cited by examiner

*Primary Examiner* — Hai H Huynh
(74) *Attorney, Agent, or Firm* — Cantor Colburn LLP

(57) ABSTRACT

There is provided a transformation control device of a transformation chopper circuit that transforms an input by turning on and off a current using a switch and outputs the transformed input. The transformation control device controls at least an ON/OFF state of a main switch by acquiring an output voltage of the transformation chopper circuit in a case where the main switch is in an ON state, the main switch being turned on in a case where energy is accumulated in an inductor.

18 Claims, 5 Drawing Sheets

FIG. 2A  MAIN SWITCH 
FIG. 2B  SYNCHRONIZATION SWITCH 
FIG. 2C  SYNCHRONIZATION CURRENT 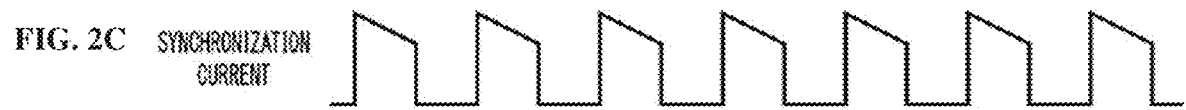
FIG. 2D  BOOST VOLTAGE 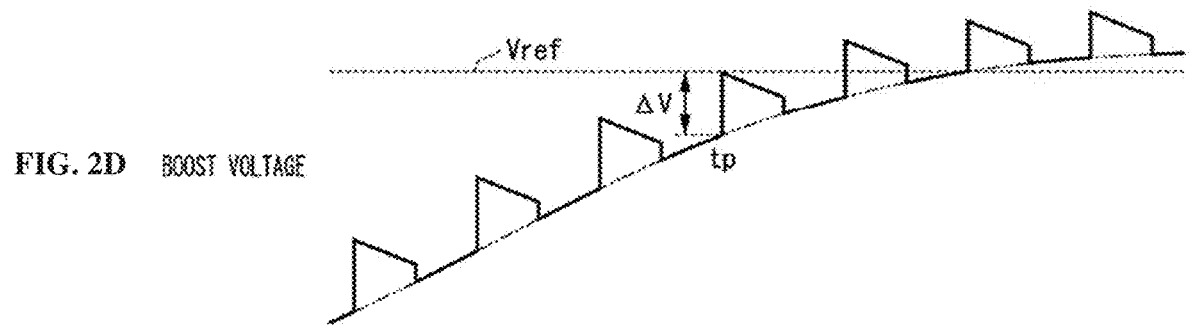

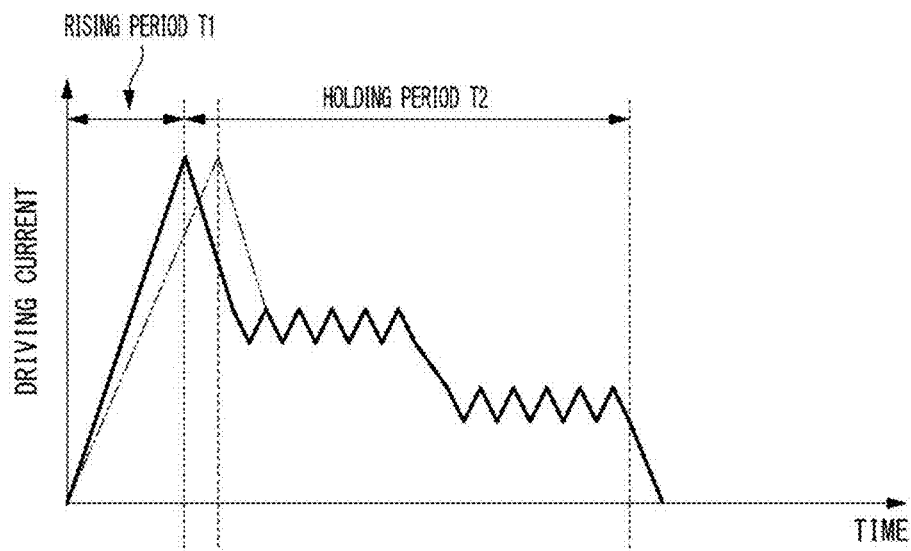
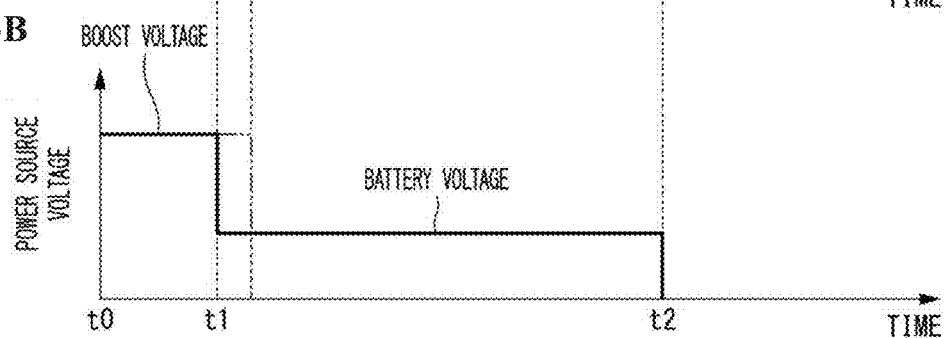
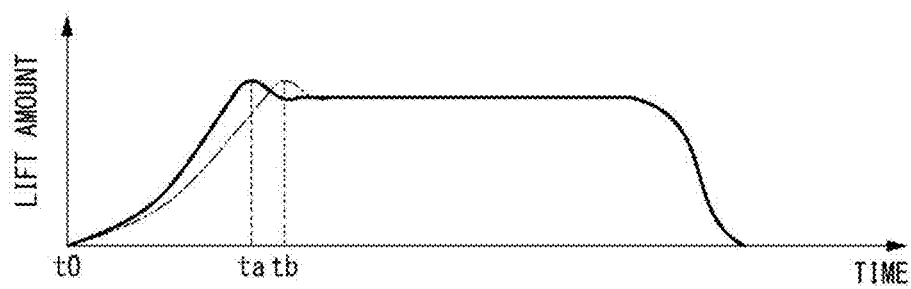

TRANSFORMATION CONTROL DEVICE AND SOLENOID VALVE DRIVING DEVICE

CROSS REFERENCE TO RELATED APPLICATIONS

The present invention claims priority under 35 U.S.C. § 119 to Japanese Patent Application No. 2020-164527, filed on Sep. 30, 2020, the entire content of which is incorporated herein by reference.

TECHNICAL FIELD

The present invention relates to a transformation control device and a solenoid valve driving device.

BACKGROUND ART

Japanese Unexamined Patent Application, First Publication No. 2012-158985 discloses boost control processing of a boost circuit that outputs a desired target voltage (DC voltage) to the outside. In the boost control processing, as shown in FIG. 3A-FIG. 3C, a CPU detects a voltage (actual boost voltage) at an output end of the boost circuit to which a smoothing capacitor is connected, and feedback-controls the boost circuit such that the actual boost voltage becomes the target voltage by adjusting the duty ratio in ON/OFF control of a first switch based on the actual boost voltage.

The boost circuit is a transformation circuit that boosts an input voltage by turning a second switch on/off in synchronization with the first switch such that electric charges released from a coil are accumulated in the smoothing capacitor. That is, in the boost circuit, in a case where the first switch is in an ON state and the second switch is in an OFF state, electric charges (energy) based on the input voltage are accumulated in the coil, and then in a case where the first switch is switched to an OFF state and the second switch is switched to an ON state, the electric charges accumulated in the coil are charged to the smoothing capacitor.

The CPU detects, as the actual boost voltage, a voltage of a terminal of the smoothing capacitor. On the other hand, in a case where internal resistance of the smoothing capacitor is relatively large, the actual boost voltage gradually reaches a final voltage based on a time constant which is defined by capacitance of the smoothing capacitor and a resistance value of the internal resistance. That is, the actual boost voltage does not reach the final voltage instantaneously, but reaches the final voltage with a time delay based on the time constant. As a result, an error may occur in the detected value of the actual boost voltage depending on when the actual boost voltage is acquired by the CPU, and the error may cause a deviation from the target voltage.

The present invention has been made in consideration of the above circumstances, and an object of the present invention is to provide a transformation control device having a smaller deviation from a target voltage as compared with a transformation control device in the related art.

SUMMARY OF THE INVENTION

According to a first aspect of a transformation control device of the present invention, there is provided a transformation control device of a transformation chopper circuit that transforms an input by turning on and off a current using a switch and outputs the transformed input. The transformation control device controls at least the ON/OFF state of a main switch by acquiring an output voltage of the transformation chopper circuit in a case where the main switch is in an ON state, the main switch being turned on in a case where energy is accumulated in an inductor.

According to a second aspect of the transformation control device of the present invention, in the transformation control device according to the first aspect, the transformation chopper circuit includes a sub switch as a synchronization switch that is turned on/off in opposition to the main switch, the sub switch being turned on in a case where a smoothing capacitor is charged based on the energy of the inductor.

According to a third aspect of the transformation control device of the present invention, in the transformation control device according to the first aspect, the transformation chopper circuit includes a sub switch as a diode, the sub switch being turned on in a case where a smoothing capacitor is charged based on the energy of the inductor.

According to a fourth aspect of the transformation control device of the present invention, in the transformation control device according to any one of the first aspect to the third aspect, the transformation chopper circuit is a boost chopper circuit or a bidirectional boost up/down chopper circuit.

According to a first aspect of a solenoid valve driving device of the present invention, there is provided a solenoid valve driving device including: the transformation control device according to any one of the first aspect to the fourth aspect; and a driving device that drives a solenoid valve using a boost output of the transformation control device.

According to a second aspect of the solenoid valve driving device of the present invention, in the solenoid valve driving device according to the fifth aspect, the solenoid valve is a fuel injection valve provided in an engine.

According to the present invention, it is possible to provide a transformation control device having a smaller deviation from a target voltage as compared with a transformation control device in the related art.

BRIEF DESCRIPTION OF DRAWINGS

FIG. 2A to FIG. 2D are a timing chart showing an operation of the injector driving device according to the embodiment of the present invention.

FIGS. 3A-FIG. 3C is a timing chart showing an operation and effect of the injector driving device according to the embodiment of the present invention.

DETAILED DESCRIPTION OF THE INVENTION

Hereinafter, an embodiment of the present invention will be described with reference to the drawings.

Figure 1:
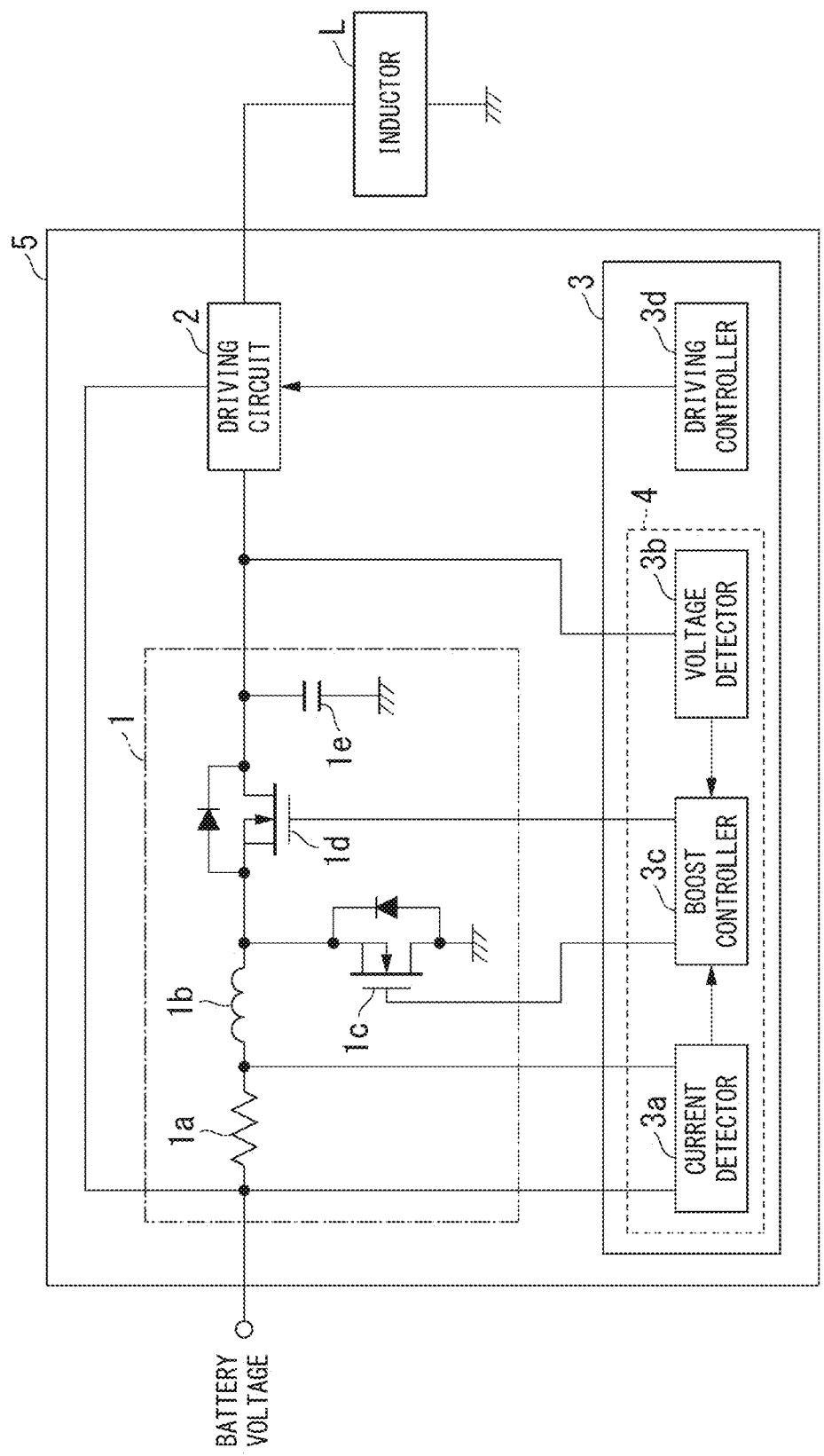
FIG. 1 is a block diagram showing an overall configuration of an injector driving device according to an embodiment of the present invention.

As shown in FIG. 1, an injector driving device 5 (driving device 5) according to the present embodiment is a solenoid valve driving device 5 that drives an injector L as a load, and includes a boost chopper circuit 1, a driving circuit 2, and a controller 3. Battery power having a predetermined voltage (battery voltage) is supplied from an external battery to an input end of the injector driving device 5. As shown in FIG. 1, the battery power is supplied to the boost chopper circuit 1 and the driving circuit 2.

As is well known, the injector L is a fuel injection valve (solenoid valve) that is provided in an engine and injects fuel into the engine, and switches between fuel injection and fuel non-injection by moving a needle valve using an electromagnet. In the injector L, in a case where a driving current supplied from the injector driving device 5 is supplied to a coil of the electromagnet, the needle valve is set to a valve closed state or a valve open state. That is, the injector L is classified into an inductive load (also referred to as an induction load) among various well-known loads.

The boost chopper circuit 1 is a kind of transformation chopper circuit that transforms an input by well-known chopper control, that is, turning a current on/off and outputs the transformed input. That is, the boost chopper circuit 1 is a power conversion circuit that converts (boosts) battery power (input power) having a first voltage into DC power (output power) having a second voltage, which is a voltage higher than the first voltage, and outputs the DC power to the injector L. As shown in FIG. 1, the boost chopper circuit 1 includes a shunt resistor 1a, an inductor 1b, a main switch 1c, a synchronization switch 1d, and a smoothing capacitor 1e.

A first end of the shunt resistor 1a is connected to the input end of the injector driving device 5, and a second end of the shunt resistor 1a is connected to a first end of the inductor 1b. The shunt resistor 1a is a resistor having a low resistance value which is a relatively low resistance value, and generates a voltage drop according to a passing current corresponding to the input power. The first end and the second end of the shunt resistor 1a are connected to the controller 3. That is, a voltage between the ends of the shunt resistor 1a is output from the boost chopper circuit 1 to the controller 3.

A first end of the inductor 1b is connected to the second end of the shunt resistor 1a, and a second end of the inductor 1b is connected to an input end of the main switch 1c and an input end of the synchronization switch 1d. In a case where the main switch 1c is in an ON state (conduction state), a current (inductor current) caused by the input power passes through the inductor 1b, and in a case where the main switch 1c is switched from the ON state to an OFF state (non-conduction state), electromagnetic energy caused by an attenuation change in the inductor current is accumulated in the inductor 1b.

The input end of the main switch 1c is connected to the second end of the inductor 1b and the input end of the synchronization switch 1d, an output end of the main switch 1c is grounded, and a control end of the main switch 1c is connected to the controller 3. That is, the output end of the main switch 1c is connected to GND as reference potential. The main switch 1c is an electronic switch that switches between the ON state (conduction state) and the OFF state (non-conduction state) according to a first boost control signal which is input from the controller 3, and is turned on in a case where electromagnetic energy is accumulated in the inductor 1b. As shown in FIG. 1, the main switch 1c is, for example, a MOS field effect transistor (MOS-FET).

The input end of the synchronization switch 1d is connected to the second end of the inductor 1b and the input end of the main switch 1c, an output end of the synchronization switch 1d is connected to a first end of the smoothing capacitor 1e and an input end of the driving circuit 2, and a control end of the synchronization switch 1d is connected to the controller 3. The synchronization switch 1d is a sub switch that is turned on/off in opposition to the main switch 1c, and is controlled by a second boost control signal which is input from the controller 3. The synchronization switch 1d is, for example, a MOS field effect transistor (MOS-FET) similar to the main switch 1c.

In order to prevent a through-current, an intermittent timing of the main switch 1c and an intermittent timing of the synchronization switch 1d are slightly shifted.

The first end of the smoothing capacitor 1e is connected to the output end of the synchronization switch 1d and the input end of the driving circuit 2, and the second end of the smoothing capacitor 1e is grounded. That is, the second end of the smoothing capacitor 1e is connected to GND as reference potential. The first end of the smoothing capacitor 1e corresponds to an output end of the boost chopper circuit 1, and is connected to the controller 3 as shown in FIG. 1. That is, the output voltage of the boost chopper circuit 1 is output to the controller 3, as a boost voltage.

Among a pair of input ends of the driving circuit 2, one input end is connected to the output end of the boost chopper circuit 1, and the other input end is connected to the input end of the injector driving device 5. Further, an output end of the driving circuit 2 is connected to the first end of the injector L, and a control input end of the driving circuit 2 is connected to the controller 3. The driving circuit 2 includes a plurality of opening/closing switches that operate based on a driving control signal which is input from the controller 3 to the control input end. The driving circuit 2 supplies a driving current having a desired waveform to the injector L by alternatively selecting boost power (boost output) and battery power (non-boost output) and applying the selected power to the injector L.

The controller 3 is a control device that controls the boost chopper circuit 1 and the driving circuit 2, and generates the first boost control signal, the second boost control signal, and the driving control signal based on a predetermined control program. That is, the controller 3 is a software control device in which hardware resources and software resources are combined, and includes at least an input/output circuit that transmits and receives a signal to and from the boost chopper circuit 1 and the driving circuit 2, a storage device that stores control information such as a control program, and an arithmetic device that executes the control program. Preferably, the controller 3 is a software control device in which hardware resources and software resources are combined. On the other hand, the controller 3 may perform a control only by hardware.

As shown in FIG. 1, the controller 3 includes a current detector 3a, a voltage detector 3b, a boost controller 3c, and a driving controller 3d as functional components realized by cooperation of hardware resources and software resources. A boost control device is configured with the current detector 3a, the voltage detector 3b, and the boost controller 3c of these components. The boost control device corresponds to a transformation control device 4 according to the present invention.

A pair of input ends of the current detector 3a are connected to the first end and the second end of the shunt resistor 1a. The current detector 3a detects, as a boost current, a current flowing through the shunt resistor 1a, that is, an input current of the boost chopper circuit 1 based on a voltage between the ends of the shunt resistor 1a and a resistance value of the shunt resistor 1a stored in advance, and outputs the boost current to the boost controller 3c.

An input end of the voltage detector 3b is connected to the output end of the boost chopper circuit 1 and the input end of the driving circuit 2. The voltage detector 3b detects, as a boost voltage, the output voltage of the boost chopper circuit 1, and outputs the boost voltage to the boost controller 3c.

The boost controller 3c is a controller that feedback-controls the boost chopper circuit 1. Among a pair of output ends of the boost controllers 3c, one output end is connected to the control end of the main switch 1c, and the other output end is connected to the control end of the synchronization switch 1d.

The boost controller 3c causes the boost voltage to follow a desired target voltage by adjusting driving of the boost chopper circuit 1 based on the boost current which is input from the current detector 3a and the boost voltage which is input from the voltage detector 3b. That is, the boost controller 3c has a current control function and a voltage control function, and controls the boost chopper circuit 1 so as to output boost power having a boost voltage that matches the target voltage.

More specifically, the boost controller 3c controls boosting of the boost chopper circuit 1 by adjusting the first boost control signal (pulse signal) which is output to the main switch 1c, and controls an ON/OFF state of the synchronization switch 1d in correspondence with an ON/OFF state of the main switch 1c by generating the second boost control signal (pulse signal) with an ON/OFF phase opposite to a phase of the first boost control signal. As the first boost control signal, a PWM control may be used. In this case, the boost ratio of the boost chopper circuit 1 is controlled by adjusting the duty ratio of the pulse signal.

The driving controller 3d is a controller that controls the driving circuit 2. The driving controller 3d supplies the driving current having the desired waveform to the driving circuit 2 by controlling ON/OFF states of the plurality of opening/closing switches provided in the driving circuit 2. The driving controller 3d and the boost controller 3c are collectively controlled by a host control system (not shown).

Next, an operation of the injector driving device 5 according to the present embodiment will be described in detail with reference to FIG. 2A, FIG. 2B, FIG. 2C, FIG. 2D and FIGS. 3A-FIG. 3C. The injector driving device 5 performs a boosting operation and a driving operation. On the other hand, the injector driving device 5 is characterized by the boosting operation, and thus the boosting operation will be mainly described below.

FIG. 2A shows an ON/OFF operation of the main switch 1c, FIG. 2B shows an ON/OFF operation of the synchronization switch 1d, FIG. 2C shows a synchronization current flowing through the synchronization switch 1d in a case where the synchronization switch 1d is in an ON state, and FIG. 2D shows a temporal change in the boost voltage which is an output of the boost chopper circuit 1. As shown in the FIG. 2A, the main switch 1c is turned on/off at a predetermined timing, and as shown in FIG. 2B, the synchronization switch 1d is turned on/off in a phase opposite to the ON/OFF phase of the main switch 1c. Thus, as shown in FIG. 2D, the boost chopper circuit 1 boosts the battery voltage at a predetermined boost ratio and outputs the boost voltage.

Here, FIG. 2D shows a state immediately after the boost controller 3c performs a control for driving the boost chopper circuit 1 and increasing the boost voltage before a time range shown in FIG. 2D. In this state, as shown in FIG. 2D, the boost voltage gradually increases and approaches the target voltage Vref. For example, the boost voltage reaches the target voltage Vref at a timing tp.

On the other hand, as shown in FIG. 2D, the boost voltage is overlapped with a current ripple caused by the synchronization current. The boost voltage is generated in the boost chopper circuit 1 in a case where a charging current flows through the smoothing capacitor 1e by the electromagnetic energy accumulated in the inductor 1b. Thus, an original waveform is a gentle curve as shown by a two-dot chain line.

That is, the boost voltage reaches the target voltage Vref at a timing tp by the current ripple. The original boost voltage at the timing tp has a voltage value lower than the target voltage Vref by a voltage deviation $\Delta V$. The voltage deviation $\Delta V$ is a control deviation in control of the boost chopper circuit 1, and the boost voltage is adjusted to a voltage value lower than the target voltage Vref by the voltage deviation $\Delta V$.

For this situation, the boost controller 3c according to the present embodiment acquires the boost voltage which is input from the boost chopper circuit 1 during a period in which the current ripple is avoided. That is, the boost controller 3c acquires the boost voltage while avoiding a period in which the synchronization switch 1d is in an ON state, that is, during a period in which the synchronization switch 1d is in an OFF state.

An influence of the current ripple can be eliminated by a boost voltage acquisition operation of the boost controller 3c. Therefore, according to the present embodiment, it is possible to provide the injector driving device 5 (or the transformation control device 4) having a smaller deviation from the target voltage Vref as compared with an injector driving device in the related art.

Here, FIG. 3A is a driving current waveform in a case where the driving circuit 2 supplies power to the injector L. In the driving current waveform, a rising period T1 is a waveform portion generated in a case where the driving circuit 2 continuously applies a boost voltage (boost power) to the injector L. On the other hand, a holding period T2 is a waveform portion generated in a case where the driving circuit 2 intermittently applies a battery voltage (battery power) to the injector L.

In addition, FIG. 3B is a timing chart showing a power source voltage at the time of power supply in correspondence with the driving current. Further, a part of FIG. 3C is a timing chart showing a lift amount of the needle valve in the injector L in correspondence with the driving current.

As shown in FIG. 2D, in a case where the boost voltage is set (adjusted) to a value lower than the target voltage Vref by the voltage deviation $\Delta V$, in FIG. 3A, as shown by a two-dot chain line, a time at which the driving current reaches a maximum peak in the rising period T1 is later than an original time at which an influence of the current ripple is reflected and which is shown by a solid line. The delay is a factor that delays a time when the lift amount of the needle valve in the injector L becomes maximum from a timing ta to a timing tb as shown in FIG. 3C.

This is because the needle valve is opened in a case where the current supplied to the injector L reaches a predetermined value. The delay of the lift amount from the timing ta to the timing tb causes a deviation from a target injection amount of the fuel injected into the engine. That is, the deviation of the boost voltage from the target voltage Vref causes a control deviation in engine control.

In the present embodiment, the influence of the current ripple can be eliminated, and it is not necessary to adjust the boost voltage to a value lower than the target voltage Vref by the voltage deviation $\Delta V$. Thus, the deviation of the boost voltage from the target voltage Vref can be suppressed to be smaller than a deviation in the related art, and the control deviation in engine control can be suppressed to be smaller than a control deviation in the related art. Therefore, according to the present embodiment, it is possible to realize engine control with excellent controllability.

The present invention is not limited to the embodiment. For example, the following modification examples may be considered.

(1) In the embodiment, a case of reducing the voltage deviation $\Delta V$ of the boost voltage of the boost chopper circuit has been described. On the other hand, the present invention is not limited thereto. The present invention can also be applied in reduction of a voltage deviation of a boost-down voltage of a boost-down circuit or reduction of a voltage deviation $\Delta V$ of a boost-up voltage and a boost-down voltage of a bidirectional boost up/down circuit.

Figure 4:
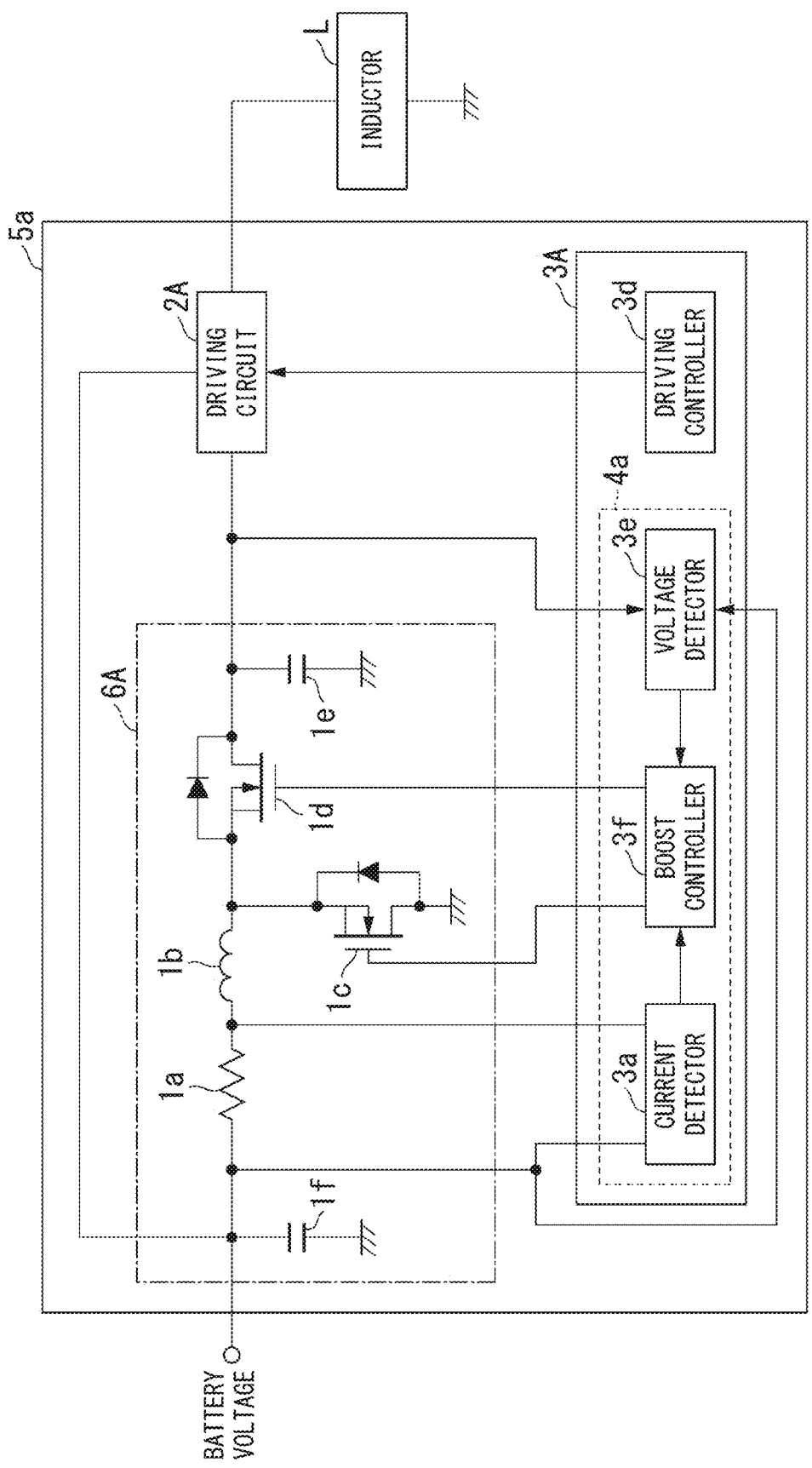
FIG. 4 is a block diagram showing an overall configuration of the injector driving device according to a modification example of the embodiment of the present invention.

For example, there is a type of the injector driving device $5a$ in which a regenerative current based on a counter electromotive force of the injector L is charged (regenerated) to a battery via a driving circuit and a bidirectional boost up/down circuit. As shown in FIG. 4, the injector driving device $5a$ includes a bidirectional boost up/down chopper circuit 6A, a driving circuit 2A, and a controller 3A.

The bidirectional boost up/down chopper circuit 6A is a power converter that performs a boost-down operation in addition to a boost-up operation, and is a transformation chopper circuit obtained by adding a smoothing capacitor $1f$ between the first end of the shunt resistor $1a$ and GND in the boost chopper circuit 1. The bidirectional boost up/down chopper circuit 6A boost-downs regenerative power which is input from the driving circuit 2A and outputs the boost-downed power to the battery by switching roles of the main switch $1c$ and the synchronization switch $1d$, in addition to a boosting operation of the boost circuit. In the boost-down operation, the synchronization switch $1d$ is turned on in a case where electromagnetic energy is accumulated in the inductor $1b$.

That is, during a period for which the main switch $1c$ that operates as a sub switch is turned off, the voltage detector $3e$ of the controller 3A acquires a boost-down voltage, which is a voltage at one end of the smoothing capacitor $1f$, and outputs the boost-down voltage to the boost controller $3f$ The boost controller $3f$ adjusts driving of the synchronization switch $1d$ that operates as a main switch such that the boost-down voltage becomes a desired boost-down target voltage. In the same manner as in FIG. 1, the current detector $3a$, the voltage detector $3e$, and the boost controller $3f$ in FIG. 4 configure the boost control device. The boost control device corresponds to the transformation control device $4a$ of the present invention. The injector driving device $5a$ is a solenoid valve driving device $5a$ that drives the injector L as a load.

Figure 5:
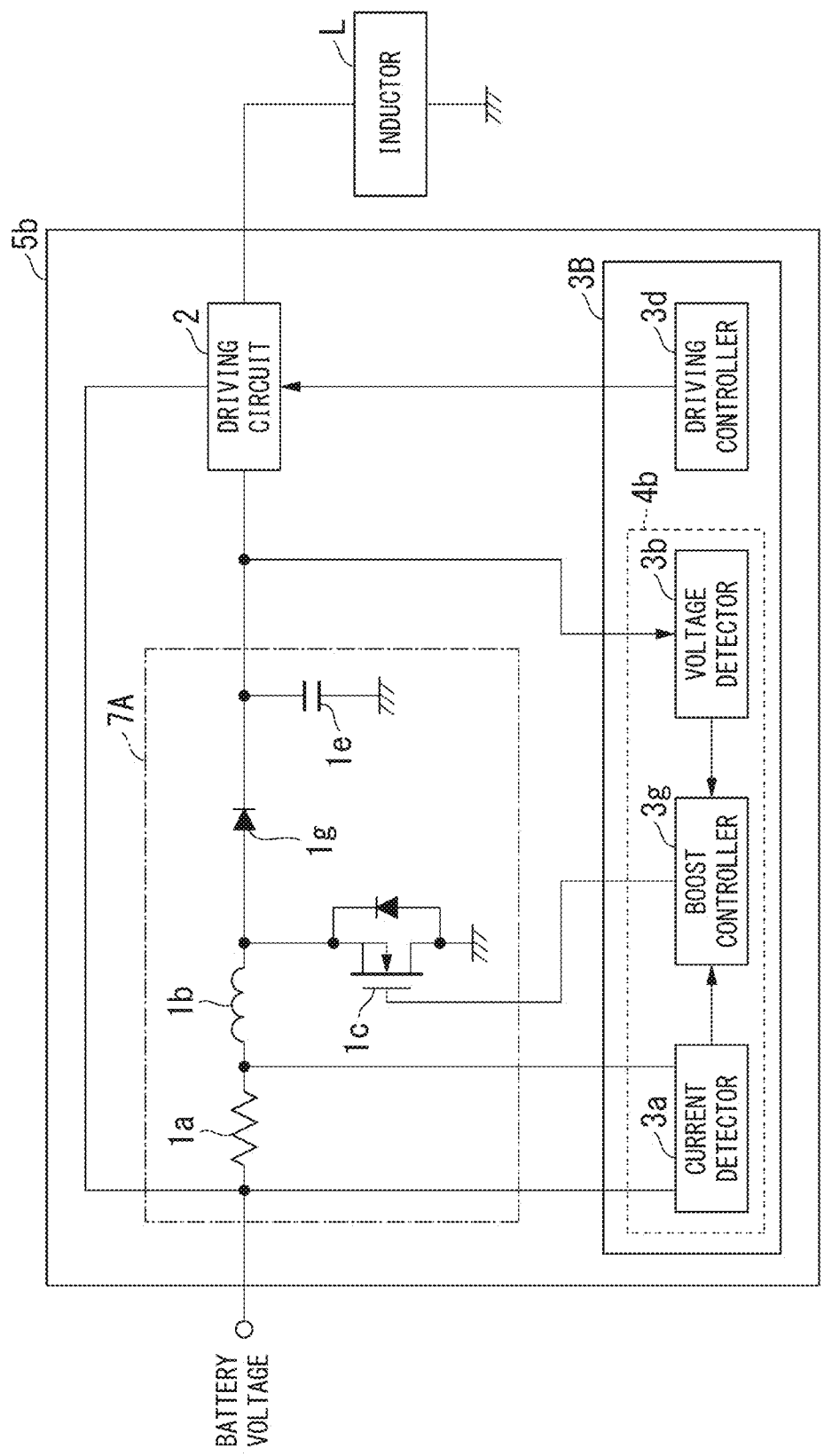
FIG. 5 is a block diagram showing an overall configuration of the injector driving device according to a modification example of the embodiment of the present invention.

(2) In the embodiment, the boost chopper circuit 1 including the synchronization switch $1d$ as a sub switch has been described. On the other hand, the present invention is not limited thereto. As shown in FIG. 5, instead of the synchronization switch $1d$, a diode $1g$ of which an anode terminal is connected to the inductor $1b$ and the input end of the main switch $1c$ and a cathode terminal is connected to the first end of the smoothing capacitor $1e$ and the input end of the driving circuit 2 may be adopted as a sub switch.

The injector driving device $5b$ shown in FIG. 5 adopts the boost chopper circuit 7A including the diode $1g$ as a passive element instead of the synchronization switch $1d$ as an active element. Thus, the controller 3B including, instead of the boost controller $3c$, the boost controller $3g$ which controls only the main switch $1c$ is adopted. The diode $1g$ is autonomously turned on/off based on voltages of the anode terminal and the cathode terminal, in the same manner as the synchronization switch $1d$. In the same manner as in FIG. 1, the current detector $3a$, the voltage detector $3b$, and the boost controller $3g$ in FIG. 5 configure the boost control device. The boost control device corresponds to the transformation control device $4b$ of the present invention. The injector driving device $5b$ is a solenoid valve driving device $5b$ that drives the injector L as a load.

(3) In the embodiment, MOS-FETs are used for the main switch $1c$ and the synchronization switch $1d$. On the other hand, the present invention is not limited thereto. For example, an insulated gate bipolar transistor (IGBT) may be adopted.

The embodiment and the modification examples of the present invention have been described with reference to the drawings. On the other hand, the present invention is not limited to the embodiment and the modification examples. The components and the combinations in the embodiment and the modification examples are only examples, and various modifications may be made based on design requirements and the like within the scope of the present invention described in the claims.

While preferred embodiments of the invention have been described and illustrated above, it should be understood that these are exemplary of the invention and are not to be considered as limiting. Additions, omissions, substitutions, and other modifications can be made without departing from the scope of the invention as claimed. Accordingly, the invention is not to be considered as being limited by the foregoing description and is only limited by the scope of the appended claims.

What is claimed is:

1. A transformation control device of a transformation chopper circuit that transforms an input by turning on and off a current using a switch and outputs the transformed input, wherein the transformation control device controls at least an ON/OFF state of a main switch by acquiring an output voltage of the transformation chopper circuit in a case where the main switch is in an ON state, the main switch being turned on in a case where energy is accumulated in an inductor.

2. The transformation control device according to claim 1, wherein the transformation chopper circuit includes a sub switch as a synchronization switch that is turned on/off in opposition to the main switch, the sub switch being turned on in a case where a smoothing capacitor is charged based on the energy of the inductor.

3. The transformation control device according to claim 2, wherein the transformation chopper circuit is a boost chopper circuit or a bidirectional boost up/down chopper circuit.

4. A solenoid valve driving device comprising:
the transformation control device according to claim 3; and
a driving device that drives a solenoid valve using a boost output of the transformation control device.

5. The solenoid valve driving device according to claim 4, wherein the solenoid valve is a fuel injection valve provided in an engine.

6. A solenoid valve driving device comprising:
the transformation control device according to claim 2; and
a driving device that drives a solenoid valve using a boost output of the transformation control device.

7. The solenoid valve driving device according to claim 6, wherein the solenoid valve is a fuel injection valve provided in an engine.

8. The transformation control device according to claim 1,
wherein the transformation chopper circuit includes a sub switch as a diode, the sub switch being turned on in a case where a smoothing capacitor is charged based on the energy of the inductor.

9. The transformation control device according to claim 8,
wherein the transformation chopper circuit is a boost chopper circuit or a bidirectional boost up/down chopper circuit.

10. A solenoid valve driving device comprising:
the transformation control device according to claim 9; and
a driving device that drives a solenoid valve using a boost output of the transformation control device.

11. The solenoid valve driving device according to claim 10,
wherein the solenoid valve is a fuel injection valve provided in an engine.

12. A solenoid valve driving device comprising:
the transformation control device according to claim 8; and
a driving device that drives a solenoid valve using a boost output of the transformation control device.

13. The solenoid valve driving device according to claim 12,
wherein the solenoid valve is a fuel injection valve provided in an engine.

14. The transformation control device according to claim 1,
wherein the transformation chopper circuit is a boost chopper circuit or a bidirectional boost up/down chopper circuit.

15. A solenoid valve driving device comprising:
the transformation control device according to claim 14; and
a driving device that drives a solenoid valve using a boost output of the transformation control device.

16. The solenoid valve driving device according to claim 15,
wherein the solenoid valve is a fuel injection valve provided in an engine.

17. A solenoid valve driving device comprising:
the transformation control device according to claim 1; and
a driving device that drives a solenoid valve using a boost output of the transformation control device.

18. The solenoid valve driving device according to claim 17,
wherein the solenoid valve is a fuel injection valve provided in an engine.

* * * * *